United States Patent [19]

Ikeda et al.

[11] Patent Number: 5,741,870
[45] Date of Patent: Apr. 21, 1998

[54] RESIN COMPOSITION

[75] Inventors: Kaoru Ikeda; Toshiaki Sato, both of Kurashiki; Kazushige Ishiura, Kashima-gun, all of Japan

[73] Assignee: Kuraray Co., Ltd., Japan

[21] Appl. No.: 691,464

[22] Filed: Aug. 2, 1996

Related U.S. Application Data

[60] Continuation of Ser. No. 514,864, Aug. 14, 1995, Pat. No. 5,571,871, which is a division of Ser. No. 208,025, Mar. 8, 1994, Pat. No. 5,466,748.

[30] Foreign Application Priority Data

| Mar. 15, 1993 | [JP] | Japan | 5-54124 |
| Jul. 14, 1993 | [JP] | Japan | 5-174335 |
| Jul. 19, 1993 | [JP] | Japan | 5-178360 |

[51] Int. Cl.$^6$ .................................................. C08F 4/52
[52] U.S. Cl. ................. 526/198; 525/326.1; 525/337; 526/75; 526/183; 526/195; 526/196; 526/239
[58] Field of Search ....................... 525/326.1, 337; 526/195, 196, 75, 183, 239, 198

[56] References Cited

U.S. PATENT DOCUMENTS

| T861,031 | 4/1969 | Logothetis . | |
| 3,887,650 | 6/1975 | Agouri et al. | 260/878 B |
| 3,928,261 | 12/1975 | Ashidaga et al. | 260/899 |
| 4,882,384 | 11/1989 | Willis et al. | 525/105 |

FOREIGN PATENT DOCUMENTS

| 0152180 | 8/1985 | European Pat. Off. . |
| 2176126 | 3/1973 | France . |
| 4030399A1 | 9/1990 | Germany . |
| 49-20615 | 5/1974 | Japan . |

*Primary Examiner*—Judy M. Reddick
*Attorney, Agent, or Firm*—Cummings & Lockwood

[57] ABSTRACT

A resin composition comprises an EVOH (A) and a thermoplastic polymer (B) having at least one functional group selected from the group consisting of boronic acid group, borinic acid group and boron-containing groups convertible into boronic acid group or borinic acid group in the presence of water. The composition may further comprise a thermoplastic polymer (C) other than (A) or (B). The resin compositions thus obtained have good compatibility and give molded products having superior transparency and good mechanical properties.

15 Claims, No Drawings

RESIN COMPOSITION

This application is a continuation of application Ser. No. 08/514,864, filed Aug. 14, 1995 and now U.S. Pat. No. 5,571,871 which is a divisional of application Ser. No. 08/208,025, filed Mar. 8, 1994, U.S. Pat. No. 5,466,748.

BACKGROUND OF THE INVENTION

1. Field of the Invention

The present invention relates to resin compositions having good compatibility and superior transparency.

2. Description of the Prior Art

Ethylene-vinyl alcohol copolymer (hereinafter referred to as EVOH) is, as it is, insufficient in softness, mechanical properties, particularly in impact strength. To improve these disadvantages, thermoplastic polymers other than EVOH, such as polyolefins are often blended with EVOH. On the other hand, thermoplastic resins such as polyolefins are insufficient in gas barrier properties, and to improve this, EVOH is often blended with such resins. Japanese Patent Publication No. 20615/1974 discloses a process for improving the mechanical properties, particularly impact strengths, of EVOH, which comprises treating EVOH with a boron compound such as boric acid, borax, trifluoroboron, an alkyl borane or an aryl borane.

However, blends of EVOH and another thermoplastic polymer such as polyolefin, having poor affinity and compatibility with each other, give molded products or films having markedly low mechanical properties and transparency. For the purpose of overcoming these problems, a variety of processes have been proposed, with no substantial success; and development of a novel process to solve these problems has been desired.

Further, as apparent from Comparative Example 2 to be described later herein, blends of EVOH treated with a boron compound, such as boric acid, and thermoplastic polymers, such as polyolefins, have insufficient compatibility and give molded products having insufficient transparency.

SUMMARY OF THE INVENTION

Accordingly, an object of the present invention is to provide a resin composition having good compatibility and being capable of giving molded products having superior transparency and good mechanical properties.

This object can be achieved by providing a resin composition comprising an EVOH (A) and a thermoplastic polymer (B) having at least one functional group selected from the group consisting of boronic acid group, borinic acid group and boron-containing groups convertible into boronic acid group or borinic acid group in the presence of water.

The object of the invention can also be achieved by providing a resin composition comprising the above component (A) and component (B) and, further, a thermoplastic resin (C) other than (A) or (B).

DETAILED DESCRIPTION OF THE INVENTION

In the present invention, blending of the above component (A) and component (S) and, also, further blending of component (C) therewith provides, surprisingly, resin compositions, particularly melt-kneaded resin compositions, that have superior compatibility and give molded products having excellent transparency. The mechanism involved is not quite clear, but it is considered to be due to bonding of the above functional groups of the thermoplastic resin to the hydroxyl group of EVOH by transesterification reaction. In the present invention, the description "a resin composition (or products molded therefrom) has superior transparency" means "a resin composition (or products molded therefrom) has better transparency than that of resin compositions comprising EVOH and an unmodified thermoplastic resin containing no boronic acid group, borinic acid group or groups convertible into the foregoing".

The EVOH used in the present invention is a saponified product of an ethylene-vinyl ester copolymer. Although the ethylene content of the EVOH is not specifically limited, it is generally selected from the range of 10 to 99 mole percent, preferably from the range of 15 to 60 mole percent, and more preferably from the range of 20 to 60 mole percent.

The saponification degree of the EVOH used in the present invention is selected from the range of 10 to 100 mole percent, preferably from the range of 50 to 100 mole percent, more preferably from the range of 80 to 100 mole percent, and most preferably from the range of 95 to 100 mole percent, especially 99 to 100 mole percent. If the saponification degree of the EVOH is too low, the resulting product will sometimes have low crystallinity and insufficient heat stability upon melt molding. The saponification degree is hence the higher the better. While vinyl acetate is mentioned as a representative of vinyl esters, other esters such as vinyl propionate, vinyl pivalate, vinyl valerate, vinyl caprate and vinyl benzoate can also be used. These vinyl esters may be used singly or as a mixture of two or more. The EVOH may be used singly or as a mixture of EVOH's having different values in at least one item among ethylene content, degree of saponification and degree of polymerization. Further, it is important that the EVOH used in the present invention be water insoluble and thermoplastic.

The EVOH in the present invention may incorporate other copolymerization components within limits so as not to impair the purpose of the invention. Examples of the other copolymerization components include olefinic monomers such as propylene, 1-butane and isobutene; acrylamides such as acrylamide, N-methylacrylamide, N-ethylacrylamide and N,N-dimethylacrylamide; methacrylamides such as methacrylamide, N-methylmethacrylamide, N-ethylmethacrylamide and N,N-dimethylmethacrylamide; vinyl ethers such as methyl vinyl ether, ethyl vinyl ether, n-propyl vinyl ether, i-propyl vinyl ether, t-butyl vinyl ether and dodecyl vinyl ether; allyl alcohol; vinyl trimethoxysilane and N-vinyl-2-pyrrolidone.

It is desirable that the EVOH used in the present invention have an intrinsic viscosity as determined in a 85/15 by weight mixed solvent of phenol/water at 30° C. of in a range of 0.1 to 5 deciliter/g (hereinafter referred to as "dl/g"), more preferably in a range of 0.2 to 2 dl/g.

The thermoplastic resins (B) usable in the present invention and having at least one functional group selected from the group consisting of boronic acid group, borinic acid group and boron-containing groups convertible into boronic acid group or borinic acid group in the presence of water are those in which the functional group is bonded to their main chain, side chains or terminals by boron-carbon bonding. Among the above, thermoplastic resins having at least one of the functional groups bonded to the side chains or terminals are preferable, with the latter being more preferable. The term "terminal" means either one terminal or both terminals.

The carbon atoms for the boron-carbon bonding includes those derived from the later-described base polymer of thermoplastic resin (B) and those from the boron-containing compounds to be reacted with the base polymer. Preferable examples of boron-carbon bonding include those of boron with an alkylene group contained in the main chain, side chains or terminals.

In the present invention, the boronic acid group is represented by the following formula (I).

  (I)

In the present invention, the boron-containing group convertible into a boronic acid group in the presence of water can be any boron-containing group as long as it is convertible into the boronic acid group shown by the formula (I) by hydrolysis in the presence of water (hereinafter simply referred to as "boron-containing group").

Representative examples of such boron-containing group include the boronic acid ester groups, boronic acid anhydride groups and boronic acid said groups represented by the following formulas (II), (III) and (IV), respectively.

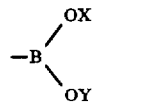  (II)

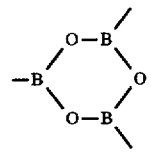  (III)

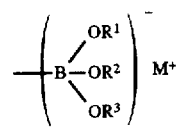  (IV)

wherein X and Y, which may be the same or different or bonded to each other, with the exception that X and Y do not represent hydrogen atoms at the same time, each represents a hydrogen atom, an aliphatic hydrocarbon group (linear type, branched alkyl group, or alkenyl group having 1 to 20 carbon atoms), an alicyclic hydrocarbon group (e.g. cycloalkyl group and cycloalkenyl group), or an aromatic hydrocarbon group (e.g. phenyl group and biphenyl group); $R^1$, $R^2$ and $R^3$, which may be the same or different, each represents a hydrogen atom or the same aliphatic, alicyclic or aromatic hydrocarbon group as for X and Y; M represents an alkali metal atom or an alkali earth metal atom; and X, Y, $R^1$, $R^2$ and $R^3$ may contain other groups such as carboxyl group and halogen atoms.

Examples of the boronic acid ester group represented by the formulas (II) to (IV) include boronic acid ester groups such as boronic acid dimethyl ester group, boronic acid diethyl ester group, boronic acid dipropyl ester group, boronic acid diisopropyl ester group, boronic acid dibutyl ester group, boronic acid dihexyl ester group, boronic acid dicyclohexyl ester group, boronic acid ethylene glycol ester group, boronic acid propylene ester group (e.g. boronic acid 1,2-propanediol ester group and boronic acid 1,3-propanediol ester group), boronic acid trimethylene glycol ester group, boronic acid neopentyl glycol ester group, boronic acid catechol ester group, boronic acid glycerin ester group and boronic acid trimethylolethane ester group; boronic acid anhydride group; boronic acid alkali metal and alkali earth metal salt groups.

In the present invention, the borinic acid group is represented by the following formula (V).

  (V)

In the present invention, the boron-containing group convertible into borinic acid group can he any boron-containing group as long as it is convertible into the borinic acid group shown by the above formula (V) by hydrolysis in the presence of water. Representative examples of such boron-containing group include the borinic acid ester groups, borinic acid anhydride groups and borinic acid salt groups represented by the following formulas (VI), (VII) and (VIII), respectively.

  (VI)

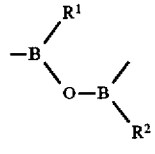  (VII)

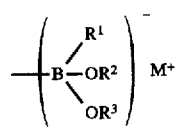  (VIII)

wherein, i.e. in the above formulas (V) to (VII), X is the same as defined above, Z represents the same aliphatic, alicyclic or aromatic hydrocarbon group as for X or an amino or amide group. X may be bonded to Z; $R^1$, $R^2$ and $R^3$ are the same as defined above and M is the same as M above.

Examples of the borinic acid ester group of formulas (V) to (VII) include those with X, Z, $R^1$, $R^2$ and $R^3$ each representing methyl, ethyl, propyl, butyl, 1-methylpropyl, pentyl, hexyl or phenyl. Representative examples are methylborinic acid group, methylborinic acid methyl ester group, ethylborinic acid methyl ester group, methylborinic acid ethyl ester group, butylborinic acid methyl ester group and 3-methyl-2-butylborinic acid methyl ester group.

Among the above mentioned functional groups boronic acid ester groups such as boronic acid ethylene glycol ester group are particularly preferred.

The so far described "boron-containing group convertible into boronic acid group or borinic acid group in the presence of water" means "a group that is convertible into boronic acid group or borinic acid group when the thermoplastic polymer (B) containing it is hydrolyzed in water, a mixed solvent of water and an organic solvent (e.g. toluene, xylene and acetone) or a mixed solvent of said organic solvent and an aqueous boric acid solution at a temperature in a range of room temperature to 150° C., for a reaction time of 10 minutes to 2 hours.

There is no particular limitation to the content of the above functional group, but it is preferably in a range of 0.0001 to 1 meq/g, more preferably in a range of 0.001 to 0.1 meq/g. It is surprising that presence of such a small amount of the functional group improves the resin composition in compatibility and transparency.

Representative examples of the base polymers used for the thermoplastic resin (B) are polymers which are essentially incompatible with EVOH, such as olefin polymers, vinyl polymers and diene polymers. Examples of monomers constituting the olefin polymers, vinyl polymers and diene polymers include olefin monomers represented by α-olefins such as ethylene, propylene, 1-butene, isobutene, 3-methylpentene, 1-hexene and 1-octene; vinyl esters such as vinyl acetate, vinyl propionate and vinyl pivalate; acrylic acid esters such as methyl acrylate, ethyl acrylate, butyl acrylate, hexyl acrylate, octyl acrylate, dodecyl acrylate and 2-ethylhexyl acrylate; methacrylic esters such as methyl methacrylate, ethyl methacrylate, butyl methacrylate, octyl methacrylate and dodecyl methacrylate; acrylamides such as acrylamide, N-methylacrylamide, N-ethylacrylamide and N,N-dimethylacrylamide; methacrylamides such as methacrylamide, N-methylmethacrylamide, N-ethylmethacrylamide and N,N-dimethylmethacrylamide; halogenated vinyl monomers such as vinyl chloride, vinilidene chloride and vinyl fluoride; aromatic vinyl monomers such as styrene and methylstyrene; acrylonitriles such as acrylonitrile and methacrylonitrile; and dienes such as butadiene and isoprene.

The base polymer used in the present invention is a polymer derived from one, two or at least three monomer types selected from the above monomers. Examples of suitable base polymers are ethylene-based polymers such as ultra low density polyethylene, low density polyethylene, medium density polyethylene, high density polyethylene, linear low density polyethylene, ethylene-vinyl acetate copolymer, ethylene-acrylate copolymers, metal salts of ethylene-acrylate copolymers, such as Na, K, and Zn-based ionomers, and ethylene-propylene copolymer; propylene-based polymers; aromatic vinyl polymers such as polystyrene, styrene-acrylonitrile copolymers, styrene-butadiene copolymers, styrene-butadiene-acrylonitrile copolymers and styrene-maleic anhydride copolymers; diene polymers such as hydrogenated aromatic vinyl monomer-diene monomer-aromatic vinyl monomer block copolymers polyisoprene polybutadiene chloroprene isoprene-acrylonitrile copolymers (nitrile rubber) and isoprene-isobutene copolymers (butyl rubber).

The thermoplastic resin (B) used in the present invention preferably has a melt Index (MI; at 190° C., 2160 g) of in a range of 0.01 to 1000 g/10 min, more preferably in a range of 0.1 to 100 g/10 min.

Representative process for producing the thermoplastic resin (B) used in she present invention and having at least one functional group selected from the group consisting of boronic acid group, borinic acid group and boron-containing groups is now described.

The first process for producing thermoplastic polymer (B); Polyolefin having terminal boronic acid group, borinic acid group or boron-containing group can be produced by pyrolyzing a polyolefin to introduce double bonds mainly into terminals and then reacting the pyrolyzed polyolefin polymers with a borane complex and a boric acid trialkyl ester.

The starting material polyolefin preferably comprises units from an olefin monomer such as ethylene, propylene or 1-butene, and has a high degree of polymerization as expressed in terms of an MI (230° C., 2160 g) of not more than 10 g/10 min, more preferably not more than 1 g/10 min.

The pyrolysis is conducted under an oxygen-free atmosphere, such as under nitrogen or in vacuo, at a reaction temperature of 300° to 500° C., for a reaction time of 1 minute to 10 hours. With respect to the degree of pyrolysis, the content of double bonds in the polyolefin after pyrolysis is preferably in a range of 0.001 to 0.2 meq/g.

The introduction of boric acid group is conducted by heating a mixture of the polyolefin having double bonds, the borane complex and boric acid trialkyl ester, in a solvent for these three components with stirring under a nitrogen atmosphere.

Preferred examples of the borane complex used in the reaction are borane-tetrahydrofuran complex, borane-dimethylsulfide complex, borane-pyridine complex, borane-trimethylamine complex and borane-triethylamine complex. Among these borane complexes, borane-triethylamine complex and borane-trimethylamine complex are preferable. The amount of the borane complex fed for the reaction is preferably in a range of 1/3 to 10 equivalents based on the double bond present in the polyolefin.

The boric acid trialkyl ester used for the reaction is preferably a boric acid lower alkyl ester such as trimethyl borate, triethyl borate, tripropyl borate or tributyl borate. The amount of the boric acid trialkyl ester fed for the reaction is preferably in a range of 1 to 100 equivalents based on the double bond in the polyolefin. The solvent is not necessarily used for the reaction, but it is, when ever used, preferably a saturated hydrocarbon type solvent such as hexane, heptane, octane, decane, dodecane, cyclohexane, ethyl cyclohexane or decaline.

It is recommended that the reaction for the introduction of boronic acid group into the polyolefin with double bonds be conducted at a reaction temperature of room temperature to 300° C., preferably 100° to 250° C., for a reaction time of 1 minute to 10 hours, preferably 5 minutes to 5 hours.

Boronic acid group and boron-containing groups are easily interconvertible into each other in the presence of water or an alcohol. For example, boronic acid dimethyl ester is converted into boronic acid by reaction with water, and boronic acid is converted into boronic acid ethylene glycol ester by reaction with ethylene glycol. The type of the ester group affects the melt index. In general, cyclic esterification by reaction of a polyolefin having boronic acid groups with a diol such as ethylene glycol or 1,3-propanediol increases the melt index. The melt index can therefore be controlled by adjusting the amount of the ester group.

The second process for producing thermoplastic polymer (B): Polyolefins, vinyl polymers or diene polymers having at least one terminal functional group selected from the group consisting of boronic acid group, borinic acid group and boron-containing groups can be produced by radical polymerization of at least one monomer selected from the group consisting of an olefin monomer, a vinyl monomer and a diene monomer in the presence of a thiol having boronic acid group, borinic acid group or boron-containing group.

Thiols having boronic acid group or boron-containing group used as the raw material can be obtained by reacting a thiol having double bond with a diborane or borane complex under an atmosphere of nitrogen and then adding an alcohol or water to the reaction mixture. Thiols having borinic acid group or boron-containing group can be obtained by reacting a thiol having double bond, a diborane or borane complex and an olefin under nitrogen and then adding an alcohol or water. Examples of thiols having double bond include 2-propane-1-thiol, 2-methyl-2-propene-1-thiol, 3-butene-1-thiol and 4-pentene-1-thiol. Among these thiols, 2-propene-1-thiol and 2-methyl-2-propene-1-thiol are preferable. The borane complex used for the reaction are as described above, among which borane-tetrahydrofuran complex is particularly preferable. The amount of the diborane or borane complex added is preferably about equivalent weight based on the thiol having double bond used for the reaction. The reaction temperature is preferably in a range of room temperature to 200° C. Examples of solvents usable for this reaction are ether type solvents such as tetrahydrofuran (THF) and diglyme and saturated hydrocarbon solvents such as hexane, heptane, ethylcyclohexane and decalin. Among these solvents, tetrahydrofuran (THF) is preferable. Preferred examples of the alcohol to be added after the reaction are lower alcohols such as methanol and ethanol, particularly methanol. There is no particular limitation to the olefin used for the preparation of the thiols having borinic acid group and its examples include lower olefins such as ethylene, propylene, 1-butene, 2-butene, 1-pentene, 2-pentene, 2-methyl-1-butene, 2-methyl-2-butene, 1-hexene and cyclohexene.

In the presence of the thus obtained thiol having at least one functional group selected from the group consisting of boronic group, borinic group and boron-containing groups, radical polymerization of at least one monomer selected from the group consisting of an olefin monomer, a vinyl monomer and a diene monomer produces a polymer having the same functional group as possessed by the thiol.

It is recommended to conduct the polymerization with an azo or peroxide indicator at a temperature in a range of room temperature to 150° C. The amount of the thiol added for the reaction is preferably in a range of 0.001 to 1 mmole/g of monomer. There is no particular limitation to the addition procedure of the thiol, but it is preferable to feed the thiol for monomers that undergo ready chain transfer, such as vinyl acetate and styrene, and to feed the thiol before the start of polymerization for monomers that undergo slow chain transfer, such as methyl methacrylate.

The third process of producing thermoplastic polymer (B): Thermoplastic polymers having on their side chains at least one functional group selected from the group consisting of boronic acid group, borinic acid group and boron-containing groups can be prepared by copolymerization of a monomer having at least one functional group selected from the group consisting of boronic acid, borinic acid and boron-containing groups and a monomer selected from the group consisting of an olefin monomer, a vinyl monomer and a diene monomer. Examples of the monomer having at least one functional group selected from the group consisting of boronic acid group, borinic acid group and boron-containing groups include 3-acryloylaminobenzeneboronic acid, 3-methacryloylaminobenzeneboronic acid and 4-vinylbenzeneboronic acid.

The thermoplastic polymer having on their side chains at least one functional group selected from the group consisting of boronic acid group, borinic acid group and boron-containing groups can also be obtained by producing a copolymer or graft copolymer by copolymerizing an unsaturated carboxylic acid, such as acrylic acid, methacrylic acid, itaconic acid, citraconic acid, fumaric acid or maleic anhydride, and at least one monomer selected from the group consisting of an olefin monomer, a vinyl monomer and a diene monomer, examples of these monomers having been mentioned before, and then reacting the carboxylic acid group of the obtained copolymer with an amino group-containing boronic acid, such as m-aminobenzeneboronic acid, in the presence of absence of a condensing agent such as carbodiimide.

Next described is a novel and useful vinyl polymer or diene polymer having the above functional group at the end thereof (B) according to the present invention.

The above functional group may be bonded to a vinyl polymer or diene polymer by directly bonding to the carbon atom of the monomer unit present at one end or both ends of the polymer or by bonding to the carbon atom contained in the linking group bound to the monomer unit present at one end or both ends of the polymer. In the latter case, there is no particular limitation to the type of the linking group and its examples are alkylene groups and phenylene groups, among which the alkylene groups represented by the following formula (IX) or (X) are preferred. These divalent linking groups may contain oxygen, sulfur, nitrogen or like atoms.

Concrete examples of these divalent linking groups are those represented by the following formulas (IX), (X) and (XI).

n = 2–30

n = 2–30

n = 2–30

Examples of monomers constituting the vinyl polymers or diene polymers used in the present invention are vinyl ester monomers, e.g. vinyl acetate, vinyl propionate and vinyl pivalate; acrylic acid esters, e.g. methyl acrylate, ethyl acrylate, butyl acrylate, hexyl acrylate, octyl acrylate, dodecyl acrylate and 2-ethylhexyl acrylate; methacrylic acid esters, e.g. methyl methacrylate, ethyl methacrylate, butyl methacrylate, octyl methacrylate and dodecyl methacrylate; acrylamides, e.g. acrylamide, N-meth-ylacrylamide, N-ethylacrylamide and N,N-dimethylacrylamide; methacrylamides, e.g. methacrylamide, N-methylmethacrylamide, N-ethylmethacrylamide and N,N-dimethylmethacrylamide; halogenized vinyl monomers, e.g. vinyl chloride, vinylidene chloride and vinyl fluoride; aromatic vinyl monomers, e.g. styrene and α-methylstyrene; acrylonitriles, e.g. acrylonitrile and methacrylonitrile; diene monomers, e.g. butadiene, isoprene, cyclopentadiene and chloroprene. The term "monomers constituting vinyl polymers" does not mean olefin monomers. Olefin monomers, however, may optionally used as another monomer component in a small amount, such as less than 50% by weight.

The vinyl polymer or diene polymer according to the present invention comprises one, two or at least 3 members of the above monomers. With 2- or at least 3-component copolymers, their chain distribution is not specifically restricted and they may be any one of random copolymers, block copolymers and graft copolymers.

Preferred base polymers in the present invention are polystyrene, polymethyl (meth)acrylates and hydrogenated products of styrene-diene based block copolymers (e.g. hydrogenated products of styrene-isoprene block copolymer, styrene-butadiene block copolymer and styrene-butadiene-styrene block copolymer).

There are no specific restrictions with respect the molecular weight of the vinyl polymer or diene polymer according to the present invention, but the weight average molecular weight is generally at least 1,000 as converted into polystyrene and determined by gel permeation chromatography, preferably 1,000 to 1,000,000, more preferably 10,000 to 300,000.

Next described is another novel and useful polyolefin polymer according to the present invention and comprising repeating units represented by the following formula (XII) and having boronic acid group, borinic acid group or a boron-containing group convertible into boronic acid group or borinic acid group in the presence of water, the boronic acid group, borinic acid or the boron-containing group being bonded to an sp³ carbon atom of the polymer (B),

wherein R¹ represents a hydrogen atom or an alkyl group having 1 to 20 carbon atoms.

The sp³ carbon atom herein means, as apparent from references, e.g. YUKI KAGOBUTSU NO SUPEKUTORU NI YORU DOTEIHO (identification of organic compounds by their spectra), 4th ed. (publisher: Tokyo Kagaku Dojin), a carbon atom having an sp³ hybrid orbit, i.e. 4-valent carbon atom having 4 single bonds. For example, all of the carbon atoms present in the repeating units represented by formula (XII) of the olefin polymers used in the present invention are sp³ carbon atoms. In the present invention, the olefin polymers therefore include those with any optional hydrogen atom in the repeating units represented by formula (XII) having been replaced by a boronic acid group, borinic acid group or boron-containing group.

The boronic acid group, borinic acid group or the boron-containing group convertible into boronic acid group or borinic acid group, possessed by the polyolefin having boronic acid group or borinic acid group bonded to an sp³ carbon atom thereof or a boron-containing group bonded to an sp³ atom thereof and convertible into boronic acid or borinic acid group in the presence of water, may be any one of sp³ carbon atoms present at the end, a side chain or the main chain of the polyolefin. Examples of bonding forms preferred in the present invention of the boronic acid group, borinic acid group or boron-containing group convertible into boronic acid group or borinic acid group are those represented by the following formulas (XIII) through (XVI).

wherein A represents a boronic acid group, borinic acid group or boron-containing group convertible into boronic acid group or borinic acid group in the presence of water, W represents a divalent saturated hydrocarbon groups which may be interrupted by a bond such as an ether bond, thioether bond, amide bond or ester bond, containing an oxygen, nitrogen, sulfur or like atoms other than carbon atom, or may be branched, P represents a polyolefin having repeating units represented by formula (XII), and P— in formulas (XIII) and (XIV) means a bond to the end of the polyolefin and /P/— in formulas (XIV) and (XVI) means a bond to a side chain of the polyolefin.

It is preferred that the linking group W be a divalent saturated hydrocarbon group having 1 to 30 carbon atoms which may be branched. Concrete examples of the linking group W are those represented by the following formula (XVII).

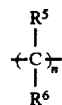

wherein R⁵ and R⁶ each represents a hydrogen atom or a lower alkyl group and n represents an integer of 1 to 30.

Preferred among the bonding forms of the formulas (XIII) through (XVI), are those of (XIII) and (XV) and those (XVI) with the linking group being a saturated hydrocarbon group having no functional group, and particularly preferred are those of formula (XIII) in which the boronic acid group, borinic acid or boron-containing group is bonded directly to a polyolefin.

There is no particular limitation to the content of the boronic acid group, borinic acid group or boron-containing group in the polyolefin of the present invention, but it is preferably in a range of 0.00001 to 1 meq/g (milliequivalent of the group per 1 g of the polyolefin), more preferably in a range of 0.0001 to 0.3 meq/g and most preferably in a range of 0.001 to 0.1 meq/g.

The R² in formula (XII), representing a hydrogen atom or an alkyl group having 1 to 20 carbon atoms, is preferably a hydrogen atom or an alkyl group having 1 to 5 carbon atoms. Thus type structural unit can be obtained by using a starting material of an olefin monomer. Examples of the olefin monomers are ethylene, propylene, 1-butene, 1-pentene, 4-methyl-1-pentene, 1-hexene, 1-heptene, 1-octene, 1-nonene and 1-decene. The polyolefin of the present invention includes homopolymers of a monomer selected from the above olefin monomers, copolymers (random copolymers and block copolymers) of the above olefin monomers and copolymers (random copolymers and block copolymers) of the above olefin monomers containing a copolymerization component of a monomer other than the above. Preferred among these are polyethylene (ultra low density, low density, medium density and high density polyethylenes), polypropylene and ethylene-propylene copolymer. It is desirable that the polyolefin have an olefin monomer content of at least 50% by weight, more preferably at least 80% by weight. Examples of copolymerization component other than olefin monomers are those other than shown above, e.g. norbornene; acrylic acid esters, e.g. methyl acrylate, ethyl acrylate and butyl acrylate; methacrylic acid esters, e.g. methyl methacrylate, ethyl methacrylate and butyl methacrylate; vinyl esters, e.g. vinyl acetate and vinyl pivalate and halogenized vinyl monomers, e.g. vinyl chloride, vinylidene chloride and vinyl fluoride.

It is desirable that the polyolefin having boronic acid group, borinic acid group or boron-containing group of the present invention have a weight average molecular weight as determined by gel permeation chromatography with a solvent of o-dichlorobenzene at 140° C. and converted into polystyrene of at least 2,000, more preferably in a range of 2,000 to 3,000,000 and most preferably in a range of 10,000 to 1,000,000.

A representative process for producing the polyolefin having boronic acid group or boron-containing group convertible into boronic acid in the presence of water is described below. The process comprises reacting under an atmosphere of nitrogen a polyolefin having carbon-carbon double bond, a borane complex and a boric acid trialkyl ester to obtain a polyolefin having boronic acid dialkyl ester group and then reacting therewith water or an alcohol In this process, use of a polyolefin having terminal double bond produces a polyolefin having terminal boronic acid group or boron-containing group convertible into boronic acid group in the presence of water; and use of a polyolefin having double bond at side chain or in the main chain produces a polyolefin having at its side chain boronic acid group or boron-containing group convertible into boronic acid group in the presence of water.

Representative processes for producing starting material polyolefins having double bond include:

1) a process of utilizing the double bond being present in a small amount at the end of the usual polyolefin;
2) one of pyrolyzing a conventional polyolefin under a non-oxygen condition to obtain a polyolefin having terminal double bond; and
3) one of compolymerizing an olefin monomer and a diene monomer to obtain an olefin-diene copolymer.

With respect to 1), known processes for producing polyolefins are applicable, but it is desirable to employ a process which comprises using no hydrogen as a chain transfer agent and using a metallocene-based polymerization catalyst (see, for example, DE4030399). For 2), there are applicable known processes (for example, U.S. Pat. Nos. 2,835,659 and 3,087,922) comprising pyrolyzing a polyolefin under a non-oxygen atmosphere, such as under nitrogen or vacuum, at a temperature of 300° to 500° C. For 3), the known process (for example Japanese Patent Application Laid-open No. 44281/1975 and DE3021273) for producing olefin-diene copolymers by using Ziegler's catalyst.

The above described vinyl polymer or diene polymer (B) and polyolefin (B), in particular the polyolefin (B) (that having the functional group bonded to an $SP^3$ carbon atom thereof) can give, when used in combination with EVOH (A), compositions having not only excellent compatibility and transparency, but also excellent mechanical properties, in particular low-temperature (0° to −50° C.) impact strength and falling ball impact strength.

The resin composition of the present invention comprises the EVOH (A) described above and the thermoplastic polymer (B) described above and having at least one functional group selected from the group consisting of boronic acid group, borinic acid group and boron-containing groups, in a ratio by weight of component (A): component (B) selected from the range of 99:1 to 1:99, preferably in a range of 95:5 to 5:95. The ratio of component (A): component (B) is preferably in a range of 95:5 to 50:50 for imparting heat resistance and superior mechanical features to component (A), while the ratio is preferably in a range of 5:95 to 50:50 for imparting gas barrier properties and resistance to solvents to component (B).

Use of a polyolefin, particularly polypropylene, as the base polymer for component (B) improves hot water resistance, as apparent from Examples 1 and 2 to be described later herein. The resulting compositions are hence markedly useful for applications requiring hot water resistance, for example retort packaging materials.

Use of an ethylene polymer, diene polymer, e.g. hydrogenated block copolymers of aromatic vinyl monomer (styrene, etc.)-diene monomer (isoprene, butadiene, etc.)-aromatic vinyl monomer as the base polymer for component (B) improves impact strength, as apparent from Examples 3 through 6 to be described later herein. The resulting compositions are hence useful for applications requiring good resistance to shock, such as bottles, tubes, cups, pouches and similar packaging materials.

The resin composition of the present invention includes an embodiment which comprises, in addition to component (A) and component (B), a thermoplastic polymer (C) other than (A) or (C), in particular one having essentially low compatibility with component (A).

In the present invention, it is surprising that incorporation of a thermoplastic resin (C) having essentially low compatibility with component (A) still produces, thanks to the presence of component (B), resin compositions having good compatibility and superior transparency. This is shown in Example 2 to be described later herein. In this case, the ratio by weight between components (A), (B) and (C) is suitably selected from the range of (A): [(B)+(C)] of in the range of 99:1 go 1:99, and is preferably in a range of 95:5 to 5:95. The ratio by weight of (A): [(B)+(C)] is preferably in a range of 95:5 to 50:50 for imparting hot water resistance and mechanical features to component (A), and in a range of 5:95 to 50:50 for imparting good gas barrier properties and resistance to solvents to components (B) and (C). For example, when the base polymer for components (B), and (C) are polypropylene, the ratio by weight of (A): [(B)+(C)] is preferably in a range of 5:95 to 45:55 for the improvement of the polypropylene in barrier properties and resistance to solvents, and in a range of 95:5 to 55:45 for imparting good heat resistance to EVOH (A). As the thermoplastic polymer (C) used here, mentions are made of the base polymers for component (B), in particular those having essentially poor compatibility with EVOH. These base polymers are used singly or in combination of two or more. Also usable as the thermoplastic polymer (C) are polyesters such as polyethylene terephthalate and polybutylene terephthalate; polyamides, polycarbonates, polyvinylidene chloride, polyvinyl chloride, polyurethanes and polyacetals.

The above components can be blended by any one of known processes, such as blending with a Banbury mixer and melt-blending with single- or twin-screw extruder. Further the components can be blended by master batch process. Upon the blending, other additives such as antioxidants, ultraviolet absorbers, lubricants, plasticizers, antistatic agents, colors, heat stabilizers (e.g. acetic acid, alkali metal salts of acetic acid, alkali earth metal salts of acetic acid and higher aliphatic acid salts such as calcium stearate and sodium stearate), phosphor compounds (e.g. calcium phosphate, potassium phosphate, magnesium phosphate and sodium phosphate) and inorganic compounds (e.g. mica, montmorillonite, talc, sericite, glass fibers, bentonite, clay, hydrotalcite, metal oxides, metal hydroxides and metal salts) may be added within limits so as not to impair the purpose of the present invention.

The resin compositions of the present invention can be easily molded by any conventional melt molding process, such as T-die extrusion, tubular film process, blow molding, injection molding or pressing, into a variety of molded products having an optional form, such as films, sheets, cups, tubes, bottles, fibers, rods or pipes. The size of dispersed particles of component (A) or (B), or a mixture of components (B) and (C) present in the obtained molded products as islands component is generally as small as 0.01 μm to 2 μm, preferably in a range of 0.01 to 1 μm.

The resin composition of the present invention also includes an embodiment where the component (B) used in the invention is added to scraps generated during production of films, sheets, tubes, bottles and the like comprising a multilayered structure comprising an EVOH layer and a thermoplastic resin (polyolefin, etc.) layer, e.g. multilayered structures comprising EVOH layer/thermoplastic resin layer and those comprising thermoplastic resin layer/EVOH layer/thermoplastic resin layer. The resin compositions of the present invention can be suitably used for multilayered structures comprising, in addition to a layer of the resin composition of the invention, layers of other thermoplastic resins such as the base polymer for component (B), polyesters (e.g. polyethylene terephthalate and polybutylene terephthalate), polyamides, polycarbonates, polyvinyl chloride, polyvinilyidene chloride, polyurethanes, polyacetals and EVOH. This type multilayered structures can be produced by any known process such as co-extrusion, co-injection or extrusion coating. Scraps generated during these molding processes can be also re-used. Upon the re-use of such scraps, the resin compositions of the present invention or component (B) used in the present invention can be blended with the scraps. Thermoforming with such multilayered structures, in particular multilayered sheets and films, can give containers such as cups. Furthermore, blow molding or biaxially stretching blow molding with such multilayered structures, in particular parisons, can give desired tubes, bottles and the like.

For the preparation of multilayered structures, it is often desirable to put an adhesive layer between a layer of the resin composition of the present invention and a layer of another thermoplastic resin to achieve sufficient inter-layer bonding. In this case, any adhesive can be used as long as it can sufficiently bond the two layers. Examples of suitable adhesives include olefin polymers or copolymers [e.g. polyethylenes {(low density polyethylene, linear low density polyethylene LLDPE) and super low density polyethylene (SLDPE)}, ethylene-vinyl acetate copolymers, ethylene-(meth)acrylic acid copolymers, ethylene-(meth)acrylate (methyl or ethyl ester) copolymers and polypropylene] grafted with an unsaturated carboxylic acid or anhydrides thereof, such as maleic anhydride; and diene polymers modified with an acid anhydride, e.g. hydrogenated styrene-butadiene copolymers modified with an acid anhydride such as maleic anhydride, liquid polybutadiene modified with an acid anhydride and ethylene-propylene-diene copolymers modified with an acid anhydride.

Examples of the construction of the multilayered structures include the resin composition layer/thermoplastic resin layer, the resin composition layer/thermoplastic resin layer/ the resin composition layer, thermoplastic resin layer/the resin composition layer/thermoplastic resin layer, thermoplastic resin layer/the resin composition layer/recovered scrap resin layer/thermoplastic resin layer, thermoplastic resin layer/recovered scrap resin layer/the resin composition layer/recovered scrap resin layer/thermoplastic resin layer, and, also, the above constructions with an adhesive layer placed at at least one boundary between two adjacent layers.

The molded products and multilayered structures obtained from the resin compositions of the present invention are particularly useful as packaging materials for those foods, pharmaceuticals, fabrics and the like that require good gas barrier properties. They are also useful as tubes or tanks for fuels such as gasoline that require good resistance to shock, and bottles for agricultural purposes.

EXAMPLES

Other features of the invention will become apparent in the course of the following descriptions of exemplary embodiments which are given for illustration of the invention and are not intended to be limiting thereof.

In the Synthesis Examples and Examples that follow, "parts" and "%" mean "parts by weight" and "% by weight", respectively, unless otherwise specified. The melt index values (hereinafter referred to as "MI") are those measured at 190° C., 2160 g unless otherwise specified. The intrinsic viscosity was determined by measurement 30° C. In a 85/15 by weight mixed solvent of phenol/water (hereinafter referred to as water-containing phenol"). The molecular weights of vinyl polymers or diene polymers were determined by GPC with a solvent of tetrahydrofuran and expressed in terms of weight average molecular weight as converted into polystyrene, unless otherwise specified. The molecular weight of polyolefin was determined by GPC with a solvent of o-dichlorobenzene and expressed in terms of weight average molecular weight as converted into polystyrene.

The content of double bond in polyolefins was determined by 270 MHz $^1$H-NMR spectrometry in deuterated p-xylene.

For polypropylene and polyethylene, the content of boronic acid group and boronic acid ester group was determined by 270 MHz $^1$H-NMR spectrometry in a mixed solvent of deuterated p-xylene, deuterated chloroform and ethylene glycol in a ratio of 8:2:0.02. For other polymers, the content of boronic acid group was determined by 270 MHz $^1$H-NMR spectrometry in a mixed solvent of deuterated chloroform and ethylene glycol in a ratio of 10:0.02.

The content of borinic acid group and borinic acid ester group was determined by 500 MHz $^1$H-NMR spectrometry in a solvent of deuterated chloroform.

The haze was measured according to JIS K7105.

Synthesis Example 1

[Synthesis of Polypropylene having Terminal Double Bond]

A separable flask was charged with 200 g of polypropylene (MI(at 230° C., 2160 g): 0.3 g/10 min) and heated in vacuo at a bath temperature of 250° C. for 1 hour. The bath temperature was elevated up to 340° C. and heating was continued for 2 hours. After cooling, the polypropylene was taken out and pulverized, to give a polypropylene having terminal double bond in an amount of 0.031 meq/g and an MI of 80 g/10 min.

Synthesis Example 2

[Synthesis of Polypropylene having Terminal Boronic Acid Group]

A separable flask equipped with a cooler and a stirrer was charged with 100 g of the polypropylene obtained in Synthesis Example 1 and 200 g of decalin. After the air in the flask had been replaced by nitrogen, the flask was heated to 180° C., and then nitrogen was flowed into the flask for 30 minutes. To the contents 5.5 g of trimethyl borate and 760 mg of borane-triethylamine complex were added and reaction was effected at 180° C. for 4 hours, after which the reaction mixture was cooled to room temperature. The obtained gel-like polypropylene was washed well with a 1/1 mixed solvent of methanol/acetone and dried, to give a polypropylene having the chemical structure of the following formula (XVIII) and having 0.025 meq/g of boronic acid group being bonded to an SP$^3$ carbon atom, an MI of 4 g/10 min and a weight average molecular weight as converted into polystyrene of 180,000.

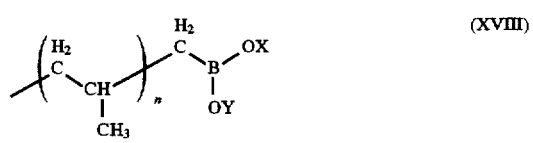

(XVIII)

wherein X and Y each represents H or CH$_3$.

Synthesis Example 3

[Synthesis of Ethylene-Propylene Copolymer having Terminal Double Bond]

A separable flask was charged with 250 g of ethylene-propylene copolymer having a polypropylene content of 26% and an MI (230° C., 2160 g) of 0.7 g/10 min, and heated in vacuo at a bath temperature of 280° C. for 30 min. The bath temperature was elevated up to 320° C. and heating was continued for 2 hours and 10 minutes. The obtained reaction product was found to be an ethylene-propylene copolymer with terminal double bond having a propylene content of 26%, a terminal double bond content of 0.035 meq/g, an MI of 8 g/10 min and a weight average molecular weight as converted into polystyrene of 130,000.

Synthesis Example 4

[Synthesis of Ethylene-Propylene Copolymer having Terminal Boronic Acid Group]

A separable flask equipped with a cooler was charged with 30 g of the ethylene-propylene copolymer obtained in Synthesis Example 3, 145 mg of borane-pyridine complex and 1.12 g of tributyl borate and the air in the flask was replaced with nitrogen. After effecting reaction at 170° C. for 40 minutes, the reaction temperature was raised to 220° C. and the reaction was further continued for 1 hour. The reaction mixture was cooled to room temperature, and the gel-like polymer that formed was dissolved in toluene and precipitated from a 1/1 mixed solvent of methanol/acetone. The procedure was repeated for purification. Finally, the precipitate was dried in vacuo at 80° C. for 12 hours, to give an ethylene-propylene copolymer having 0.018 meq/g of boronic acid group having bonded to an $SP^3$ carbon atom, an MI of 1.5 g/10 min and a weight average molecular weight as converted into polystyrene of 130,000.

Synthesis Example 5

[Synthesis of Low Density Polyethylene having Terminal Double Bond]

A separable flask was charged with 200 g of a low density polyethylene having an MI of 0.35 g/10 min and heated in vacuo at a bath temperature of 260° C. for 30 minutes. Then the bath temperature was elevated to 340° C. and heating was continued for 2 hours, to obtain a low density polyethylene having 0.06 meq/g of terminal double bond and an MI of 90 g/10 min.

Synthesis Example 6

[Synthesis of Low Density Polyethylene having Terminal Boronic Acid Group]

A separable flask equipped with a cooler was charged with 30 g of the low density polyethylene obtained in Synthesis Example 5, 300 mg of borane-pyridine complex, 2.25 g of tributyl borate and 50 g of decalin. After the air in the flask had been replaced with nitrogen, the flask was heated at 190° C. for 3 hours. The reaction mixture was cooled to room temperature, and the obtained gel-like polyethylene was sufficiently washed with a 1/1 mixed solvent of methanol/acetone and dried. The obtained product was found to be an ethylene-propylene copolymer having 0.035 meq/g of boronic acid group being bonded to an $SP^3$ carbon atom, an MI of 2 g/10 min and a weight average molecular weight as converted into polystyrene of 80,000.

Synthesis Example 7

[Synthesis of 3-mercaptopropyl Boronic Acid Ethylene Glycol Ester]

A flask equipped with a cooler and a dropping funnel was charged with 19.26 g of sodium borohydride ($NaBH_4$), and the air in the flask was replaced with nitrogen. The flask was then charged with 500 ml of tetrahydrofuran having been dried over benzophenene and metallic sodium and distilled, and cooled to 0° C. in an ice bath. To the contents 99.95 g of boron trifluoride-diethyl ether complex was added dropwise over 30 minutes. The reaction mixture was allowed to stand for 2 hours, and then 45.61 g of 2-propene-1-thiol was added dropwise at 0° C. over 30 minutes. The reaction mixture was stirred for 40 minutes. The temperature was then elevated to 60° C. and stirring was further continued for 3 hours. The mixture was cooled to 0° C. and then 100 ml of methanol was added dropwise over 40 minutes. After solid matter had been removed by filtration, the solvent was distilled off, and 38 g of ethylene glycol was added. Thereafter, the reaction mixture was extracted with methylene chloride-water to remove excess ethylene glycol, and dried over magnesium sulfate. Vacuum distillation was conducted, to obtain 46.7 g of a 4/1 mixture of 3-mercaptoboronic acid ethylene glycol ester and 2-mercapto-1-methylethylboronic acid ethylene glycol ester (boiling point: 70° C. at 4 mmHg.

Synthesis Example 8

[Synthesis of 4-(2-mercaptoethyl)phenylboronic Acid Ethylene Glycol Ester]

A flask equipped with a dewatering column was charged with 2.92 g of 4-vinylphenylboronic acid, 1.38 g of ethylene glycol and 50 ml of benzene, and heated at 80° C. for 30 minutes, while the water formed by reaction was removed. To the reaction mixture was added 3.18 g of thioacetic acid and 47 mg of 2,2'-azobisisobutylonitrile, and the resulting mixture was heated at 75° C. for 2 hours. After removal of reaction solvent by distillation, the residue was extracted with methylene chloride-aqueous sodium hydrogen carbonate solution. The methylene chloride layer was dried over magnesium sulfate, and then the solvent was distilled off. Another flask was charged with 5 g of the thus obtained crude 4-(2-acethylthioethyl)phenylboronic acid ethylene glycol ester, 20 ml of methanol and 10 ml of triethylamine, and reaction was effected at 65° C. for 20 hours under a nitrogen atmosphere. The reaction mixture was subjected to vacuum distillation, to give 3.55 g of 4-(2-mercaptoethyl) phenylboronic acid ethylene glycol ester (boiling point: 135° C. at 0.2 mmHg).

Synthesis Example 9

[Synthesis of 3-mercaptopropyl(3-methyl-2-butyl) borinic Acid Methyl Ester]

The air in a flask equipped with a dropping funnel and a stirrer was replaced with nitrogen, and then the flask was charged with 310 ml of 1N borane solution in tetrahydrofuran (THF). The flask was cooled to 0° C. in an ice bath, and then 21.74 g of 2-methyl-2-butene was added dropwise over 6 minutes with stirring. After 30 minutes, 22.79 g of 2-propene-1-thiol was added dropwise over 30 minutes. After stirring for 40 minutes, the temperature of reaction mixture was raised to 60° C., and stirring was continued for 1 hour. The reaction mixture was cooled to 0° C., and 50 ml of methanol was added dropwise over 12 minutes. Distilling off of the solvent from the reaction mixture, gave 27.2 g of 3-mercaptopropyl(3-methyl-2-butyl)boronic acid methyl ester (boiling point: 50° C. at 0.5 mmHg).

Synthesis Example 10

[Synthesis of Polystyrene having Terminal Boronic Acid Ester Group]

A flask equipped with a reflux-cooler and a stirrer was charged with 500 g of styrene and 0.0765 g of the 3-mercaptopropylboronic acid ethylene glycol ester (MPBE) obtained in Synthesis Example 7, and then the atmosphere in the flask was evacuated. After heating of the flask to 120° C., a solution in styrene of 0.394% of MPBE (3-mercaptopropylboronic acid ethylene glycol ester) and 0.069% of azobiscyclohexane carbonitrile was added, at first by 7.2 ml and thereafter at a rate of 0.5 ml/min. The feed of the styrene solution was stopped after 210 minutes, and the reaction was terminated at the same time. The conversion was found to be 45%. The obtained polystyrene was purified with repetition of precipitation from methanol and then dried, to give a polystyrene having an MI of 2 g/10 min, 0.013 meq/g of terminal boronic acid ethylene glycol ester group and a weight average molecular weight as converted into polystyrene of 130,000.

Synthesis Example 11

[Synthesis of Polymethyl Methacrylate having Terminal Boronic Acid Ethylene Glycol Ester Group]

A flask equipped with a stirrer and a cooler was charged with 150 g of methyl methacrylate and 0.876 g of the 3-mercaptopropylboronic acid ethylene glycol ester obtained in Synthesis Example 7 and the air in the flask was replaced by nitrogen. The temperature of the flask was raised to 80° C., and at first 1.5 ml and then 0.5 ml every 30 minutes of a separately prepared 0.23% solution of azobisisobutyronitrile in toluene was added. After 5 hours, the reaction mixture was cooled down to terminate polymerization. The conversion was found to be 47%. The obtained crude polymethyl methacrylate was precipitated from methanol and was dried, to give a mixture of polymethyl methacrylates having an MI of 0.5 g/10 min and 0.03 meq/g of terminal boronic acid ethylene glycol ester group (mixture of the following formulas (XIX) and (XX) in a ratio of 8:2).

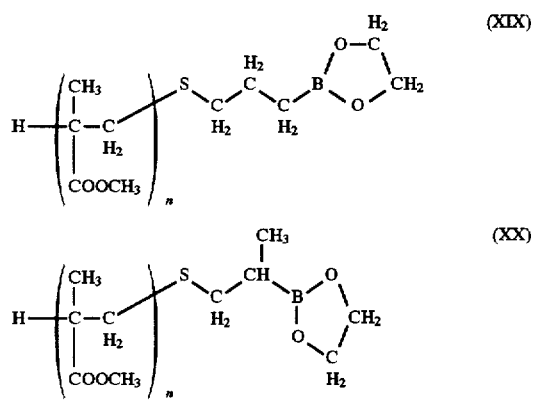

Synthesis Example 12

[Synthesis of Polymethyl Methacrylate having Terminal Boronic Acid Ester Group]

The same procedures for the polymerization and after treatments of Synthesis Example 11 were followed with the use of 1.248 g of the mercaptoethylphenylboronic acid ethylene glycol ester obtained in Synthesis Example 8 instead of the 3-mercaptoboronic acid ethylene glycol ester, to obtain a polymethyl methacrylate having an MI of 0.5 g/10 min and 0.03 meq/g of terminal boronic acid ethylene glycol ester group and a weight average molecular weight as converted into polystyrene of 57,000.

Synthesis Example 13

[Synthesis of Polymethyl Methacrylate having Terminal Borinic Acid Group]

A flask equipped with a stirrer and a cooler was charged with 150 g of methyl methacrylate and 1.225 g of the 3-mercaptopropyl(3-methyl-2-butyl)borinic acid methyl ester obtained in Synthesis Example 9, and the air in flask was purged with nitrogen gas flow. After the temperature of reaction mixture had been raised to 80° C., a separately prepared 0.23% solution of azobisisobutyronitrile in toluene was added, at first by 1.5 ml and then 0.5 ml every 30 minutes. After 5 hours, the reaction mixture was cooled down to terminate the reaction. The conversion was found to be 61%. The obtained crude polymethyl methacrylate was reprecipitated from methanol and dried, to give a polymethyl methacrylate having an MI of 0.5 g/10 min and 0.03 meq/g of terminal borinic acid group.

Synthesis Example 14

[Synthesis of Hydrogenated Styrene-Isoprene-Styrene Block Copolymer having Boronic Acid Ester Groups on Side Chains]

A separable flask equipped with a stirrer and a cooler as charged with 30 g of a maleic anhydride modified hydrogenated styrene-isoprene-styrene block copolymer (styrene content: 35%, degree of hydrogenation: 96%, maleic anhydride content: 0.03 meq/g) and 100 g of xylene. Separately, a solution of 3-aminophenylboronic acid ethylene glycol ester in xylene was prepared by dehydrating distillation of a mixture of 20 g of xylene, 310 mg of 3-aminophenylboronic acid hydrate and 120 mg of ethylene glycol, and the solution was fed to the flask. The reaction mixture was heated at 140° C. for 3 hours. After cooling of the reaction mixture, the polymer that formed was reprecipitated from methanol containing 0.1% of ethylene glycol, and dried, to give a hydrogenated styrene-isoprene-styrene copolymer having an MI of 2 g/10 min and 0.028 meq/g of boronic acid ethylene glycol ester groups on side chains.

Example 1

Melt kneading was conducted with 5 g of the polypropylene having terminal boronic acid group obtained in Synthesis Example 2 and 45 g of EVAL (Registered trade mark) F101 manufactured by Kuraray Co., Ltd. (ethylene content: 32 mole percent, degree of saponification: 99.5%, MI in water-containing phenol at 30° C.: 1.1 dl/g) under the following conditions.
Type of machine: Plastograph
Rotor Shape: Roller type
Revolutions per minute: 80 rpm
Kneading temperature: 220° C.
Kneading time: 10 minutes The resin composition obtained by the kneading was heat pressed at 220° C. to give a film with a thickness of 100 μm. The obtained film was broken in liquid nitrogen, and the ruptured cross section was extracted with xylene at 140° C. Then the cross sections was observed in a scanning electron microscope. As a result, the film was found to have dispersed particles of the polypropylene having an average particle diameter of 0.3 μm. The film had a haze of 15%. This film showed little or no deformation when treated with hot water under pressure at 110° C. for 30 minutes.

Comparative Example 1

Example 1 was repeated except that 5 g of an unmodified polypropylene (MI: 4 g/10 min) was used instead of 5 g of the polypropylene having terminal boronic acid group, to obtain a film with dispersed particles of the unmodified polypropylene having an average diameter 5 µm and having a haze of 43%. These results show that the film had poor compatibility and transparency. This film was partially deformed when treated with hot water at 110° C.

Comparative Example 2

Example 1 was repeated except that 5 g of an unmodified polypropylene (MI: 4 g/10 min) was used instead of 5 g of the polypropylene having terminal boronic acid group and that as EVOH an ethylene-vinyl alcohol copolymer treated with boric acid (ethylene content: 32 mole percent, boric acid content: 0.14%, intrinsic viscosity in water-containing phenol at 30° C.: 0.83 dl/g) was used, to obtain a film with dispersed particles of the polypropylene having an average diameter of 5 µm and having a haze of 40%. These results show that the film had poor compatibility and transparency. This film was partially deformed by hot water treatment at 110° C.

Comparative Example 2

EVAL (Registered trade mark) F101 manufactured by Kuraray Co., Ltd. was singly heat pressed at 220° C. to give a film. This film was completely deformed, losing its original form, by hot water treatment under the same conditions as in Example 1.

Example 2

Melt kneading was conducted with 5 g of the polypropylene having terminal boronic acid group obtained in Synthesis Example 2, 40 g of an unmodified polypropylene (MI: 1.5 g/10 min) and 5 g of EVAL (Registered trade mark) E105 (ethylene content: 44 mole percent, degree of saponification: 99.5%, intrinsic viscosity in water-containing phenol at 30° C.: 0.96 dl/g) under the following conditions.
Type of machine: Plastograph
Rotor shape: Roller type
Revolutions per minute: 80 rpm
Kneading temperature: 220° C.
Kneading time: 10 minutes The resin composition obtained by the kneading was heat pressed at 220° C., to give a film with a thickness of 100 µm. The obtained film was broken in liquid nitrogen, and the ruptured cross section was extracted with dimethyl sulfoxide (DMSO) at 80° C. and observed in a scanning electron microscope. As a result, the film was found to have dispersed particles of the ethylene-vinyl alcohol copolymer having an average diameter of 0.3 µm. The film had a haze of 13%.

Comparative Example 4

Example 2 was repeated except that 5 g of a polypropylene (MI: 4 g/10 min) was used instead of 5 g of the polypropylene having terminal boronic acid group, to obtain a film with dispersed particles of the ethylene-vinyl alcohol copolymer having an average diameter of 6 µm, and having a haze of 40%.

Example 3

Example 1 was repeated except that 5 g of the ethylene-propylene copolymer having terminal boronic acid group obtained in Synthesis Example 4 was used instead of 5 g of the polypropylene having terminal boronic acid group, to obtain a film with dispersed particles of the ethylene-vinyl alcohol copolymer having an average diameter of 0.4 µm, and having a haze of 40%. Separately, the resin composition was molded into test specimens through a small injection molding machine. The specimens were tested in accordance with JIS K7120, to show a notched Izod impact strength of 25 kgf·cm/cm².

Example 4

Example 1 was repeated except that 10 g of the ethylene-propylene copolymer having terminal boronic acid group obtained in Synthesis Example 4 was used instead of the polypropylene having terminanl boronic acid group and that 40 g, instead of 45 g, of the EVAL (Registered trade mark)-F101 (ethylene content: 32 mole percent, degree of saponification: 99.6 mole percent, intrinsic viscosity in water-containing phenol at 30° C.: 1.1 dl/g), to obtain a film with dispersed particles of the ethylene-propylene copolymer having an average diameter of 0.4 µm, and having a haze of 65%. Separately, the resin composition obtained was injection molded into test specimens. The specimens were tested for notched Izod impact strength in accordance with JIS K7120, but they did not break.

Comparative Example 5

Example 4 was repeated except that 10 g of an ethylene-propylene copolymer (propylene content: 26 mole percent, MI: 2 g/10 min) was used instead of 5 g of the ethylene-propylene copolymer having terminal boronic acid group, to obtain a film with dispersed particles of the ethylene-propylene copolymer having an average diameter of 7 µm, and having a haze of 83%. The specimens prepared by injection molding the resin composition showed a notched Izod impact strength of 9 kgf·cm/cm².

Example 5

Example 3 was repeated except that 5 g of the low density polyethylene having terminal boronic acid group obtained in Synthesis Example 6 was used instead of 5 g of the ethylene-propylene copolymer having terminal boronic acid group, to obtain a film with dispersed particles of the polyethylene having an average diameter of 0.4 µm, and having a haze of 12%. The injection molded test specimens from the resin composition showed a notched Izod impact strength of 12 kgf·cm/cm².

Comparative Example 6

Example 3 was repeated except that 5 g of a low density polyethylene (MI: 2 g/10 min) was used instead of 5 g of the ethylene-propylene copolymer having terminal boronic acid group, to obtain a film with dispersed particles of the polyethylene having an average diameter of 4 µm, and having a haze of 20%. The injection molded test specimens from the resin composition showed a notched Izod strength of 3.5 kgf·cm/cm².

Comparative Example 7

Test specimens were prepared by injection molding of the EVAL (Registered trade mark)-F101 alone in the same manner as in Example 3. The specimens showed a notched Izod impact strength of 2.1 kgf·cm/cm².

Example 6

Example 3 was repeated except that 5 g of the hydrogenated styrene-isoprene-styrene block copolymer having boronic acid ethylene glycol ester groups on side chains obtained in Synthesis Example 14 was used instead of 5 g of the ethylene-propylene copolymer having terminal boronic acid group, to obtain a film with dispersed particles of the block copolymer having an average diameter of 0.4 µm, and having a haze of 13%. The test specimens obtained by injection molding the resin composition showed a notched Izod impact strength of 23 kgf·cm/cm².

Comparative Example 8

Example 3 was repeated except that 5 g of a hydrogenated styrene-isoprene-styrene block copolymer (styrene content: 35 mole percent, MI: 2 g/10 min, degree of hydrogenation: 95%) was used instead of 5 g of the ethylene-propylene copolymer having terminal boronic acid group, to obtain a film with dispersed particles of the block copolymer having an average diameter of 5 µm, and having a haze of 35%. The test specimens obtained by injection molding the obtained resin composition showed a notched Izod impact strength of 4.5 kgf·cm/cm².

Example 7

Example 1 was repeated except that 5 g of the polystyrene having terminal boronic acid group obtained in Synthesis Example 10 was used instead of 5 g of the polypropylene having terminal boronic acid group, to obtain a film with disperse particles of the polypropylene having an average diameter of 0.5 µm, and having a haze of 32%.

Comparative Example 9

Example 1 was repeated except that 5 g of a polystyrene having an MI of 2 g/min was used instead of 5 g of the polypropylene having terminal boronic acid group, to obtain a film with disperse particles of the polystyrene having an average diameter of 5 µm, and having a haze of 85%.

Example 8

Example 1 was repeated except that 5 g of the polymethyl methacrylate having terminal boronic acid ethylene glycol ester group obtained in Synthesis Example 11 was used instead of 5 g of the polypropylene having terminal boronic acid group, to obtain a film with dispersed particles of the polymethyl methacrylate having an average diameter of 0.08 µm, and having a haze of 8%.

Example 9

Example 1 was repeated except that 5 g of the polymethyl methacrylate having terminal boronic acid ethylene glycol ester group obtained in Synthesis Example 12 was used instead of the polypropylene having terminal boronic acid group, to obtain a film with dispersed particles of the polymethyl methacrylate having an average diameter of 0.1 µm, and having a haze of 11%.

Example 10

Example 1 was repeated except that 5 g of the polymethyl methacrylate having a terminal borinic acid group obtained in Synthesis Example 13 was used instead of 5 g of the polypropylene having terminal borinic acid group, to obtain a film with dispersed particles of the polymethyl methacrylate having an average diameter of 0.1 µm, and having a haze of 10%.

Comparative Example 10

Example 1 was repeated except that 5 g of a conventional polymethyl methacrylate having an MI of 0.5 g/10 min was used instead of 5 g of the polypropylene having terminal boronic acid group, to obtain a film with dispersed particles of the polymethyl methacrylate having an average diameter of 2.5 µm, and having a haze of 72%.

To make comparisons more easy, summary tables were prepared; wherein:

Table 1 summarizes the preparation conditions employed in Examples 1 and 2 and Comparison Examples 1 through 3;

Table 2 shows the results of evaluaton on the films obtained in the above Examples and Comparative Examples.

Tables 3 and 4 summarizes the preparation conditions and the results obtained in Examples 3 through 6 and Comparison Examples 6 through 8, respectively; and Tables 5 and 6 summarizes the preparation conditions and the results obtained in Examples 7 through 10 and Comparison Examples 9 and 10, respectively.

TABLE 1

| | Resin Composition | | | Component (B) | | | |
|---|---|---|---|---|---|---|---|
| | Component (A) (parts by weight) | Component (B) (parts by weight) | Component (C) (parts by weight) | Base polymer | bonding type | Content of functional group (meq/g) | Melt index (g/10 min) |
| Example 1 | EVOH (9) | PP (Syn. Ex. 2) (1) | — | PP*1 | terminal boronic acid group | 0.025 | 4 |
| Comp. Ex. 1 | EVOH (9) | PP (MI = 4) (1) | — | PP | — | 0.025 | 4 |
| Comp. Ex. 2 | EVOH (9) | PP (MI = 4) (1) | Boric acid | PP | — | — | 4 |
| Comp. Ex. 3 | EVOH (10) | — | — | — | — | — | — |
| Example 2 | EVOH (1) | PP (Syn. Ex. 2) (1) | PP (MI = 1.5) (8) | PP | terminal boronic acid group | 0.025 | 4 |
| Comp. Ex. 4 | EVOH (1) | PP (MI = 4) (1) | PP (MI = 1.5) (8) | PP | — | 0.025 | 4 |

*1 PP: Polypropylene

TABLE 2

| | Average particle diameter of Component (A) or Component (B) dispersed in film (μm) | | Characteristics of film | |
|---|---|---|---|---|
| | | | Haze (%) | Resistance to hot water *2 |
| Example 1 | 0.3 | (Particle diameter of component (B)) | 15 | ○ |
| Comp. Ex. 1 | 5 | (Particle diameter of component (B)) | 43 | x |
| Comp. Ex. 2 | 5 | (Particle diameter of component (B)) | 40 | x |
| Comp. Ex. 3 | — | | — | x |
| Example 2 | 0.3 | (Particle diameter of component (A)) | 13 | ○ |
| Comp. Ex. 4 | 5 | (Particle diameter of component (A)) | 40 | x |

*2:
○ showed good resistance to hot water and no deformation.
x showed good resistance to hot water and deformed.

TABLE 3

| | Resin Composition | | | Component (B) | | | |
|---|---|---|---|---|---|---|---|
| | Component (A) (parts by weight) | Component (B) (parts by weight) | Component (C) (parts by weight) | Base polymer | bonding type | Content of functional group (meq/g) | Melt index (g/10 min) |
| Example 3 | EVOH (9) | EP (Syn. Ex. 4) (1) | — | EP*3 | terminal boronic acid group | 0.018 | 1.5 |
| Example 4 | EVOH (8) | EP (Syn. Ex. 4) (2) | — | EP | terminal boronic acid group | 0.018 | 1.5 |
| Comp. Ex. 5 | EVOH (8) | EP (MI = 2) (2) | — | EP | — | — | 2 |
| Example 5 | EVOH (9) | LDPE (Syn. Ex. 4) (1) | — | LDPE*4 | terminal boronic acid group | 0.035 | 2 |
| Comp. Ex. 6 | EVOH (9) | LDPE (MI = 2) (1) | — | LDPE | — | — | — |
| Comp. Ex. 7 | EVOH (10) | — | — | — | — | — | — |
| Example 6 | EVOH (9) | SEPS (Syn. Ex. 14) (1) | — | SEPS*5 | side-chained boronic acid ethylene glycol ester group | 0.028 | 2 |
| Comp. Ex. 8 | EVOH (9) | SEPS (MI = 2) (1) | — | SEPS | — | — | 2 |

*3 EP: ethylene-propylene copolymer;
*4 LDPE: low density polyethylene;
*5 SEPS: styrene-isoprene-styrene block copolymer

TABLE 4

| | Average particle diameter of Component (A) or Component (B) dispersed in film (μm) | Film Haze (%) | Injection Molded Article Impact strength (kgf · cm/cm²) (at 20° C.) |
|---|---|---|---|
| Example 3 | 0.4 | 40 | 25 |
| Example 4 | 0.4 | 65 | did not break |
| Comp. Ex. 5 | 7 | 83 | 9 |
| Example 5 | 0.4 | 12 | 12 |
| Comp. Ex. 6 | 4 | 20 | 3.5 |
| Comp. Ex. 7 | — | — | 2.1 |
| Example 6 | 0.3 | 13 | 23 |
| Comp. Ex. 8 | 5 | 35 | 4.5 |

TABLE 5

| | Resin Composition | | | Component (B) | | | |
|---|---|---|---|---|---|---|---|
| | Component (A) (parts by weight) | Component (B) (parts by weight) | Component (C) (parts by weight) | Base polymer | bonding type | Content of functional group (meq/g) | Melt index (g/10 min) |
| Example 7 | EVOH (9) | PSt (Syn. Ex. 10) (1) | — | PSt*6 | terminal boronic acid group | 0.013 | 1.5 |
| Comp. Ex. 9 | EVOH (9) | PSt (MI = 2) (1) | — | PSt | — | — | 1.5 |
| Example 8 | EVOH (9) | PMMA (Syn. Ex. 11) (1) | — | PMMA*7 | terminal borinic acid ester group | 0.03 | 0.5 |
| Example 9 | EVOH (9) | PMMA (Syn. Ex. 12) (1) | — | PMMA | terminal boronic acid ethylene glycol ester group | 0.03 | 0.5 |
| Example 10 | EVOH (9) | PMMA (Syn. Ex. 13) (1) | — | PMMA | terminal borinic acid ethylene glycol ester group | 0.03 | 0.5 |
| Comp. Ex. 10 | EVOH (9) | PMMA (MI = 0.5) (1) | — | PMMA | — | — | 0.5 |

*6 PSt: polystyrene
*7 PMMA: polymethyl methacrylate

TABLE 6

| | Average particle diameter of Component (A) or Component (B) dispersed in film (μm) | Haze (%) |
|---|---|---|
| Example 7 | 0.5 | 32 |
| Comp. Ex. 9 | 5 | 85 |
| Example 8 | 0.08 | 8 |
| Example 9 | 0.1 | 11 |
| Example 10 | 0.1 | 10 |
| Comp. Ex. 10 | 2.5 | 72 |

Synthesis Example 1-1

[Synthesis of 3-mercaptopropylboronic Acid Dimethyl Ester]

A flask equipped with a cooler and a dropping funnel was, after replacement of the air in the flask by nitrogen, charged with 300 ml of a commercially available 1 mole/l solution in THF of a borane-THF complex (made by Aldrich Co.). After cooling in an ice-bath to 0° C., 23 g of 2-propene-1-thiol was added dropwise over 30 minutes. After being stirred for 1 hour, the mixture was heated to a temperature of 60° C. and, after being further stirred for 3 hours, cooled to 0° C. again. To the mixture, 50 ml of methanol was added over 30 minutes. After removal of the solvent by distillation, the residue was subjected to vacuum distillation to give 24 g of a 4:1 mixture of 3-mercaptopropylboronic acid dimethyl ester and 2-mercapto-1-methylethylboronic acid dimethyl glycol ester (boiling point: 50° C. at 1 mmHg).

Synthesis Example 1-2

[Synthesis of Polyvinyl Acetate having Terminal Boronic Acid Group]

A flask equipped with a stirrer and a cooler was charged with 580 g of vinyl acetate and 0.033 g of the 3-mercaptopropylboronic acid dimethyl ester (MPBDM) obtained in Synthesis Example 1-1, and the flask was heated to 70° C. After addition of 20 g of a 0.12% solution of azobisisobutyronitrile in vinyl acetate, a separately prepared 13 g/l solution of MPBDM in ethyl acetate was fed at a rate of 0.6 ml/min. After 180 minutes, the polymerization and the feed were stopped. The conversion was found to be 36%. The obtained polymer was reprecipitated from hexane, then boiled in 100 ml of distilled water for 1 hour and dried, to give a polyvinyl acetate having 0.045 meq/g of terminal boronic acid group and a weight average molecular weight as converted into polystyrene of 35,000.

Synthesis Example 1-3

[Synthesis of Hydrogenated Styrene-Isoprene Block Copolymer having Terminal Boronic Acid Ester Group]

A pressure-proof vessel (capacity: 1.5 liter) was charged with 500 g of cyclohexane and 0.003 mole of lithium s-butyl and the mixture was heated to 50° C. While the temperature was maintained at this level, 60 g of styrene was added dropwise and polymerization was effected. To the mixture 120 g of isoprene was added dropwise and polymerization was effected.

Then 0.7 ml (2 molar equivalents to the anion living terminal) of sufficiently dewatered trimethyl borate was added and reaction was effected for 1 hour. Thereafter, a separately prepared Ziegler's catalyst was added in an amount of 0.01 times the carbon-carbon double bonds in the polymer and then hydrogenation was conducted under a hydrogen pressure of 10 kg/cm² and at a temperature of 70° C., for 5 hours. After completion of the hydrogenation, acidic water was added to decatalyze and the mixture was dried, to give a hydrogenated styrene-isoprene block copolymer having terminal boronic acid group (molecular weight of styrene block: 20,000; styrene content: 33%, degree of hydrogenation: 90%; boronic acid group content: 0.013 meq/g).

Example 1-1

Example 1 was repeated except that 5 g of the styrene-isoprene block copolymer having terminal boronic acid group obtained in Synthesis Example 1-3 was used instead of 5 g of the polypropylene having terminal boronic acid group, to obtain a film with dispersed particles of the styrene-isoprene block copolymer having an average diameter of 0.4 μm and having a haze of 14%, thus showing good compatibility and transparency. The specimens prepared by injection molding the above composition showed a notched Izod impact strength as measured according to JIS K7120 of 18 kgf·cm/cm$^2$.

Synthesis Example 2-1

[Synthesis of Polypropylene having Terminal Double Bond]

A separable flask was charged with 200 g of a polypropylene (weight average molecular weight as converted into polystyrene: 780,000). The flask with the contents was heated under vacuum at a bath temperature of 250° C. for 1 hour. The bath temperature was raised to 330° C. and heating was continued for 2 hours. After cooling, the contents were taken out and pulverized, to give a polypropylene having 0.018 meq/g of terminal double bond and a weight average molecular weight as converted into polystyrene of 180,000.

Synthesis Example 2-2

[Synthesis of Polypropylene having Terminal Boronic Acid Group]

A separable flask equipped with a stirrer and a cooler was charged with 100 g of the polypropylene obtained in Synthesis Example 2-1 and 200 g of decalin and the air in the flask was replaced by nitrogen. To the contents, 2.3 g of trimethyl borate end 380 mg of borane-triethylamine complex were added and reaction was effected at 180° C. for 4 hours. The reaction mixture was allowed to cool to room temperature, to give a gel-like polypropylene. The gel-like polypropylene was sufficiently washed with a 1/1 mixture of water/acetone and then with a 1/1 mixture or water/acetone and dried, to give a polypropylene represented by the following formula and having a weight average molecular weight as converted to polystyrene of 180,000 and 0.013 meq/g of terminal boronic acid group, the boronic acid group being bonded to an sp$^3$ carbon atom.

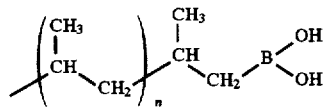

Synthesis Example 2-3

[Synthesis of Ethylene-Propylene Copolymer having Terminal Boronic Acid Group]

A separable flask equipped with a cooler was charged with 30 g of the ethylene-propylene copolymer obtained in Synthesis Example 3, 145 mg of borane-pyridine complex and 1.12 g of tributyl borate and the air in the flask was replaced by nitrogen. Reaction was effected at 170° C. for 40 minutes and, after temperature elevation to 220° C., reaction was further effected for 1 hour. The reaction mixture was allowed to cool to room temperature, dissolved in toluene, reprecipitated from a 1/1 mixed methanol/acetone solvent. The crude copolymer obtained was dissolved in toluene again, reprecipitated from a 9/1 mixed solvent of acetone/water and finally vacuum-dried at 80° C. for 12 hours, to give an ethylene-propylene copolymer having a weight average molecular weight as converted into polystyrene of 130,000 and 0.018 meq/g of terminal boronic acid group, the boronic acid group being bonded to an sp$^3$ carbon atom.

Synthesis Example 2-4

[Synthesis of Polypropylene having Terminal Boronic Acid Group]

A flask was charted with 2 g of the polypropylene having terminal boronic acid group obtained in Synthesis Example 2-2 and the air in the flask was replaced by nitrogen. To the contents, 124 mg of ethylene glycol and 20 ml of acetone and reaction was effected at a room temperature for 24 hours. The reaction mixture was washed with acetone and vacuum-dried, to give a polypropylene having a weight average molecular weight as converted into polystyrene of 80,000 and 0.012 meq/g of terminal boronic acid ethylene glycol ester group, the boronic acid ester group being bonded to an sp$^3$ carbon atom.

Synthesis Example 2-5

[Synthesis of Polypropylene having Terminal Boronic Acid 1,3-propanediol Ester Group]

Synthesis Example 2-4 was repeated except that 152 mg of 3-propanediol was used instead of 124 mg of ethylene glycol, to obtain a a polypropylene having a weight average molecular weight as converted to polystyrene of 180,000 and 0.012 meq/g of terminal boronic acid 1,3-propanediol ester group, the boronic acid ester group being bonded to sp$^3$ carbon atom.

Synthesis Example 2-6

[Synthesis of Polypropylene having Terminal Boronic Acid Glycerine Ester Group]

Synthesis Example 2-4 was repeated except that 184 mg of glycerine was used instead of 124 mg of ethylene glycol, to obtain a a polypropylene having a weight average molecular weight as converted into polystyrene of 180,000 and 0.013 meq/g of terminal boronic acid glycerine ester group, the boronic acid ester group being bonded to an sp$^3$ carbon atom.

Synthesis Example 2-7

[Synthesis of Ethylene-Propylene Copolymer having Boronic Acid Ethylene Glycol Ester Group at Side Chain]

A separable flask equipped with a stirrer and a cooler was charged with 20 g of an ethylene-propylene-ethylidenenorbornene copolymer (propylene content: 28%, ethylidenenorbornene content: 1%, weight average molecular weight as converted into polystyrene: 80,000) and 180 ml of decalin were added and the air in the flask was replaced by nitrogen. To the mixture 0.21 g of borane-triethylamine complex and 4.6 g of tributyl borate and reaction was effected at 200° C. for 3 hours. The reaction mixture was allowed to cool to room temperature and the copolymer solution obtained was reprecipitated from a 1/1 mixed methanol/acetone solvent. The crude copolymer obtained was dissolved in 100 ml of toluene, to which solution 1 ml of ethylene glycol was added. The mixture was stirred at room temperature for 5 hours. The solution was reprecipitated from acetone and finally vacuum-dried at 100° C. for 12 hours, to give an ethylene-propylene copolymer having a weight average molecular weight as converted into polystyrene of 100,000 and 0.07 meq/g of side-chain boronic acid ethylene glycol ester group, the boronic acid ester group being bonded to an $sp^3$ carbon atom.

Synthesis Example 2-8

[Synthesis of Ethylene-Propylene Copolymer having Terminal Boronic Acid Ethylene Glycol Ester Group]

A separable flask equipped with a stirrer and a cooler was charged with 20 g of the ethylene-propylene copolymer obtained in Synthesis Example 2-3, 100 ml of toluene and 1 g of ethylene glycol and the air in the flask was replaced by nitrogen. The mixture was dissolved by heating at 80° C. with stirring and the solution was further heated for 30 minutes. The solution obtained was reprecipitated from acetone and the precipitate was vacuum-dried, to give an ethylene-propylene copolymer having a weight average molecular weight as converted into polystyrene of 130,000 and 0.018 meq/g of terminal boronic acid ethylene glycol ester group, the boronic acid ester group being bonded to an $sp^3$ carbon atom.

Example 2-1

Melt kneading was conducted with 5 g of the polypropylene having terminal boronic acid ethylene glycol ester group obtained in Synthesis Example 2-4 and 45 g of EVAL (Registered trade mark)-F101 manufactured by Kuraray Co., Ltd. (ethylene content: 32 mole percent, degree of saponification: 99.5%, instrinsic viscosity determined in water-containing phenol at 30° C.: 1.1 dl/g) under the following conditions.
Type of machine: Plastograph
Rotor Shape: Roller type
Revolutions per minute: 80 rpm
Kneading temperature: 220° C.
Kneading time: 10 minutes The resin composition obtained by the kneading was heat pressed at 220° C. to give a film with a thickness of 100 μm. The obtained film was broken in liquid nitrogen, and the ruptured cross section was extracted with xylene at 140° C. Then the cross sections was observed in a scanning electron microscope. As a result, the film was found to have dispersed particles of the polypropylene having an average particle diameter of 0.3 μm. The film had a haze of 13%. This film showed little or no deformation when treated with hot water under pressure at 110° C. for 30 minutes.

Example 2-2

Example 2-1 was repeated except that 5 g of the ethylene-propylene copolymer having terminal boronic acid obtained in Synthesis Example 2-3 was used instead of 5 g of the polypropylene having terminal boronic acid ethylene glycol ester group and that the Kuraray-made EVAL (Registered trade mark)-F101 was used in an amount of 40 g instead of 45 g, to obtain a film with dispersed particles of the ethylene-propylene copolymer having an average diameter of 0.3 μm and having a haze of 40%. The specimens obtained from the composition by injection molding was tested for notched Izod impact strength according to JIS K7120 but did not break.

Synthesis Example 3-1

[Synthesis of Polypropylene having Terminal Double Bond]

A polypropylene (MI: 0.25 g/10 min, density: 0.90 g/m³) was fed to a twin-screw segmented extruder with a feeder equipped with a nitrogen inlet pipe and with a screw diameter of 25 mm and extrusion pelletization was conducted under the following conditions.
Temperature (°C.): C1/C2/C3/C4/C5/Die=250/370/370/350/270/210
Throughput: 1.45 kg/h
Screw rotations: 235 rpm
Nitrogen flow: 5 l/min The pellets obtained were immersed in hexane for 1 day and dried, to give a polypropylene having 0.012 meq/g of double bond and an MI of 12.4 g/10 min.

Synthesis Example 3-2

[Synthesis of Polypropylene having Terminal Boronic Acid Ethylene Glycol Ester Group]

A separable flask equipped with a stirrer, a cooler and a dropping funnel was charged with 1000 g of the polypropylene having terminal double bond obtained in Synthesis Example 3-1 and 2000 g of dekalin and, after deaeration of the flask under reduced pressure at room temperature, the air in the flask was replaced by nitrogen. To the contents, 40 g of trimethyl borate and 2.9 g of borane-triethylamine complex were added and reaction was effected at 200° C. for 4 hours. A distillatory was mounted on the flask and then 100 ml of methanol was gradually added dropwise. After completion of the addition, low-boiling impurities including methanol, trimethyl borate and triethylamine were distilled off by vacuum distillation. To the residue 31 g of ethylene glycol was added and the mixture was stirred for 10 minutes. The mixture was then subjected to reprecipitation from acetone, drying and pulverization, to give a polypropylene having 0.012 meq/g of boronic acid ethylene glycol ester group, the boronic acid ester group being bonded to an $sp^3$ carbon atom, an MI of 13 g/10 min and a weight average molecular weight as converted into polystyrene of 200,000.

Synthesis Example 3-3

[Synthesis of Ultra Low Density Polyethylene (ULDPE) having Terminal Boronic Acid Ethylene Glycol Ester Group]

A separable flask equipped with a stirrer, a cooler and a dropping funnel was charged with 1000 g of an ultra low density polyethylene having terminal double bond (MI: 4 g/10 min, density: 0.89 g/cm³, double bond content: 0.048 meq/g) and 2500 g of decalin and, after deaeration of the flask under reduced pressure at room temperature, the air in the flask was replaced by nitrogen. To the contents, 78 g of trimethyl borate and 5.8 g of borane-triethylamine complex were added and reaction was effected at 200° C. for 4 hours. A distillatory was mounted on the flask and then 100 ml of methanol was gradually added dropwise. After completion of the addition, low-boiling impurities including methanol, trimethyl borate and triethylamine were distilled off by vacuum distillation. To the residue 31 g of ethylene glycol was added and the mixture was stirred for 10 minutes. The mixture was then subjected to reprecipitation from acetone, drying and pulverization, to give an ultra low density polyethylene having 0.027 meq/g of boronic acid ethylene glycol ester group, the boronic acid ester group being bonded to an $sp^3$ carbon atom, an MI of 3 g/10 min and a weight average molecular weight as converted into polystyrene of 180,000.

Synthesis Example 3-4

[Synthesis of High Density Polyethylene having Terminal Boronic Acid Ethylene Glycol Ester Group]

A separable flask equipped with a stirrer, a cooler and a dropping funnel was charged with 800 g of a high density polyethylene having terminal double bond (MI: 0.5 g/10 min, density: 0.957 g/cm$^3$, double bond content: 0.04 meq/g) and 2500 g of decalin and, after deaeration of the flask under reduced pressure at room temperature, the air in the flask was replaced by nitrogen. To the contents, 59 g of trimethyl borate and 4.3 g of borane-triethylamine complex were added and reaction was effected at 200° C. for 4 hours. A distillatory was mounted on the flask and then 100 ml of methanol was gradually added dropwise. After completion of the addition, low-boiling impurities including methanol, trimethyl borate and triethylamine were distilled off by vacuum distillation. To the residue 31 g of ethylene glycol was added and the mixture was stirred for 10 minutes. The mixture was then subjected to reprecipitation from acetone, drying and pulverization, to give a high density polyethylene having 0.033 meq/g of boronic acid ethylene glycol ester group, the boronic acid ester group being bonded to an sp$^3$ carbon atom, an MI of 0.15 g/10 min and a weight average molecular weight as converted into polystyrene of 230,000.

Example 3-1

Twenty (20) parts of the ultra low density polyethylene having terminal boronic acid ethylene glycol ester group obtained in Synthesis Example 3-3 and 80 parts of a Kuraray-made EVOH (EVAL-L101; ethylene content: 27 mole %, degree of saponification: 99.7 mole %, an intrinsic viscosity as determined in a water-containing phenol at 30° C. of 1.1 dl/g) were fed to a twin-screw segmented extruder with a screw diameter of 25 mm and extrusion pelletization was conducted under the following conditions.
Temperature (°C.): C1/C2/C3/C4/C5/Die=220/220/220/220/220/220
Throughput: 2 kg/h
Screw rotations: 115 rpm The pellets obtained were injection molded into test specimens, which were tested for notched Izod impact strength at −40° C. and falling ball impact strength at −40° C. in accordance with JIS K7211, to show 12 kgf·cm/cm$^2$ and at least 300 kgf·cm, respectively.

Example 3-2

Twenty (20) parts by weight of the high density polyethylene having terminal boronic acid ethylene glycol ester group obtained in Synthesis Example 3-4 and 80 parts by weight of a Kuraray-made EVOH (EVAL-L101; ethylene content: 27 mole %, degree of saponification: 99.7 mole %, an intrinsic viscosity as determined in a water-containing phenol at 30° C. of 1.1 dl/g) were fed to a twin-screw segmented extruder with a screw diameter of 25 mm and extrusion pelletization was conducted under the following conditions.
Temperature (°C.): C1/C2/C3/C4/C5/Die=240/240/240/240/240/240
Throughput: 2 kg/h
Screw rotations: 115 rpm The pellets obtained were injection molded into test specimens, which were tested for notched Izod impact strength at −40° C. and falling ball impact strength at −40° C., to show 6.1 kgf·cm/cm$^2$ and 110 kgf·cm, respectively.

Example 3-3

Example 3-1 was repeated except that the polypropylene having terminal boronic acid ethylene glycol ester group obtained in Synthesis Example 3-2 was used instead of the ultra low density polyethylene having terminal boronic acid ethylene glycol ester group. The izod impact strength and the falling ball impact strength were 4.5 kgf·cm/cm$^2$ and 73 kgf·cm, respectively.

Comparative Example 3-1

Example 3-1 was repeated except that the ultra low density polyethylene (ULDPE) having terminal double bond used in Synthesis Example 3-3 was used instead of the ultra low density polyethylene having terminal boronic acid ethylene glycol ester group. The izod impact strength and the falling ball impact strength were 3.8 kgf·cm/cm$^2$ and 10 kgf·cm, respectively.

Comparative Example 3-2

Example 3-2 was repeated except that the high density polyethylene having terminal double bond used in Synthesis Example 3-4 was used instead of the high density polyethylene having terminal boronic acid ethylene glycol ester group. The izod impact strength and the falling ball impact strength were 3.5 kgf·cm/cm$^2$ and 5 kgf·cm, respectively.

Comparative Example 3-3

Example 3-3 was repeated except that the polypropylene having terminal double bond obtained in Synthesis Example 3-1 was used instead of the polypropylene having terminal boronic acid ethylene glycol ester group. The izod impact strength and the falling ball impact strength were 2.8 kgf·cm/cm$^2$ and 8 kgf·cm, respectively.

Comparative Example 3-4

Test specimens were prepared by injection molding a Kuraray-made EVOH (EVAL-L101; ethylene content: 27 mole %, degree of saponification: 99.7 mole %, intrinsic viscosity as determined in a water-containing phenol at 30° C. of 1.1 dl/g) and the specimens were tested for notched Izod impact strength at −40° C. and failing ball impact strength at −40° C., to show 1.8 kgf·cm/cm$^2$ and 54 kgf·cm, respectively.

Example 3-4

To a twin-screw segmented extruder with a screw diameter of 25 mm there were fed 10 parts of the ultra low density polyethylene (ULDPE) having terminal boronic acid ethylene glycol ester group obtained in Synthesis Example 3-3, 10 parts of a modified 6-nylon {poly(caprolactam-laurylolactam copolymer; laurylolactam content: 35% by weight, MI (210° C., 2160 g): 8 g/10 min} and 80 parts by weight of a Kuraray-made EVOH (EVAL-L101; ethylene content: 27 mole %, degree of saponification: 99.7 mole %, an intrinsic viscosity as determined an a water-containing phenol at 30° C. of 1.1 dl/g) and extrusion pelletization was conducted under the following conditions.
Temperature (°C.): C1/C2/C3/C4/C5/Die=220/220/220/220/220/220
Throughput: 2 kg/h
Screw rotations: 115 rpm The pellets obtained were extruded through a 20 mm-ø extruder equipped with a T-die into a film having a thickness of 50 μm. Test specimens (5 cm×1 cm) from the film were, while being strained by 5%, immersed in toluene at 0° C. for 30 minutes, to show no cracks, which shows that the film had good resistance to stress cracking.

Example 3-5

To a twin-screw segmented extruder with a screw diameter of 25 mm there were fed 5 parts of the blend used in Example 3-1, 90 parts of a high density polyethylene (Q450, made by Paxon Co.) and 5 parts of an adhesive of a maleic anhydride-modified polyethylene (ADMER-NF450 made by Mitsui Petrochemical Industries, Ltd.) and extrusion pelletization was conducted under the following conditions.

Temperature (°C.): C1/C2/C3/C4/C5/Die=240/240/240/240/240/240

Throughput: 2 kg/h

Screw rotations: 115 rpm

The pellets obtained were injection molded into test specimens having a thickness of 6.2 mm. The test specimens were tested for notched Izod impact strength, to show 14.4 kgf·cm/cm².

Example 3-6

Blend pelletization was conducted by feeding to a 40-mmø single-screw extruder with a feeder 90 parts of a high density polyethylene (Q450, made by Paxon Co.), 5 parts a Kuraray-made EVOH (EVAL-L101) and 5 parts of ADMER-NF450 made by Mitsui Petrochemical Industries, Ltd.

There was used a feed block type 4-kind/7-layer extrusion system containing a 65-mmø extruder I, a 40-mmø extruder II, a 40-mmø extruder III and a 40-mmø extruder IV, these extruders being constructed such that in each of the extruders I, II and III the melted material is divided into 2 layers and that the resin from extruder III, that from extruder II and that from extruder I are succes-sively joined with the resin from extruder IV. Co-extrusion was conducted by feeding to extruder I a high density polyethylene (Q450, made by PAXON Co.) as a resin for layer (P₁), to extruder II a blend of 100 parts of the pellets obtained above and 4 parts of the high density polyethylene having terminal boronic acid ethylene glycol ester group obtained in Synthesis Example 3-4 as a resin for layer (P₂), to extruder III ADMER-NF450 made by Mitsui Petrochemical Industries, Ltd. as a resin for layer (P₃) and to extruder IV Kuraray-made EVAL-L101 as a resin for layer (P₄), at a die temperature of 240° C. and a take-up speed of 1 m/min, to produce a 4-kind/6-layer laminate having a construction of (P₁)/(P₂)/(P₃)/(P₄)/(P₃)/(P₁). The thicknesses of the layers were 150 μm (P₁)/400 μm (P₂)/20 μm (P₃)/50 μm (P₄)/20 μm (P₃)/400 μm (P₁). The obtained laminate sheet had a good surface appearance, with no wavy patterns and no generation of gels or irregular matter.

Comparative Example 3-5

Example 3-6 was repeated except that the high density polyethylene having terminal boronic acid ethylene glycol ester was not added to the blend for layer (B), to obtain a laminate having the same composition. The laminate sheet obtained had a poor surface appearance, with wavy patterns having been formed on the central part.

Obviously, numerous modification and variations of the present invention are possible in light of the above teachings. It is therefore to be understood that within the scope of the appended claims, the invention may be practiced otherwise than as specifically described herein.

What is claimed is:

1. A polyolefin comprising a cyclic boronic acid ester group and repeating units represented by the following formula:

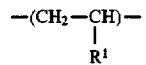

wherein $R^1$ represents a hydrogen atom or an alkyl group having 1 to 20 carbon atoms, said cyclic boronic acid ester group being bonded to an sp³ carbon atom of said polyolefin.

2. The polyolefin of claim 1 wherein $R^1$ represents a hydrogen atom.

3. The polyolefin of claim 1 wherein $R^1$ represents an alkyl group having 1 to 20 carbon atoms.

4. The polyolefin of claim 1 wherein the cyclic boronic acid ester group comprises a boronic acid ethylene glycol ester group.

5. A method of producing polyolefin comprising a cyclic boronic acid ester group which comprises reacting a polyolefin having a boronic acid group with a diol to convert the boronic acid group into a cyclic boronic acid ester.

6. The method of claim 5 wherein the diol is selected from the group consisting of ethylene glycol and 1,3-propane diol.

7. The method of claim 5 wherein the diol is ethylene glycol.

8. A polyolefin comprising repeating units represented by the formula (XII):

wherein $R^1$ represents a hydrogen atom or an alkyl group having 1 to 20 carbon atoms, said polyolefin comprising at least one functional group selected from the group consisting of:

(i) a boronic acid group represented by the following formula (I):

(ii) a boron-containing group selected from the group consisting of boronic acid ester groups, boronic acid anhydride groups and boronic acid salt groups represented by the following formulas (II), (III) and (IV), respectively:

wherein X and Y, which may be the same or different or be bonded to each other, individually represent a hydrogen atom, an aliphatic hydrocarbon group, an alicyclic hydrocarbon group, or an aromatic hydrocarbon group, with the proviso that when X and Y are both aliphatic hydrocarbon groups, X and Y are bonded to each other; $R^1$, $R^2$ and $R^3$, which may be the same or different, individually represent a hydrogen atom, an aliphatic hydrocarbon group, an alicyclic hydrocarbon group, or an aromatic hydrocarbon group; M represents an alkali metal atom or an alkaline earth metal atom; and X, Y, $R^1$, $R^2$, $R^3$ may contain carboxyl groups and/or halogen atoms;

(iii) a borinic acid group represented by the following formula (V):

(iv) a boron-containing group selected from the group consisting of borinic acid ester groups, borinic acid anhydride groups and borinic acid salt groups represented by the following formulas (VI), (VII) and (VIII), respectively:

and

wherein X is the same as defined above, Z represents the same aliphatic, alicyclic or aromatic hydrocarbon group as for X or an amino or amide group, X may be bonded to Z, $R^1$, $R^2$ and $R^3$ are the same as defined above and M is the same as defied above;

said boronic acid group, borinic acid group or boron-containing group being bonded to an $sp^3$ carbon atom of said polyolefin.

9. The polyolefin of claim 1 wherein said functional group is selected from the group consisting of boronic acid group (I) and borinic acid group (V).

10. The polyolefin of claim 1 wherein said functional group is selected from the group consisting of boronic acid ester groups (II), boronic acid anhydride groups (III) and boronic acid salt groups (IV).

11. The polyolefin of claim 1 wherein said functional group is selected from the group consisting of borinic acid ester groups (VI), borinic acid anhydride groups (VII) and borinic acid salt groups (VIII).

12. The polyolefin of claim 1 wherein said functional group is selected from the group consisting of boronic acid ester groups (II) and borinic acid ester groups (VI).

13. The polyolefin of claim 1 wherein said functional group comprises boronic acid ester groups (II).

14. The polyolefin of claim 13 wherein said boronic acid ester groups are selected from the group consisting of boronic acid ethylene glycol ester group, boronic acid propylene glycol ester group, boronic acid trimethylene glycol ester group, boronic acid neopentyl glycol ester group, boronic acid catechol ester group, boronic acid glycerin ester group and boronic acid trimethylolethane ester group.

15. The polyolefin of claim 13 wherein said boronic acid ester groups (II) are boronic acid ethylene glycol ester groups.

* * * * *

UNITED STATES PATENT AND TRADEMARK OFFICE
CERTIFICATE OF CORRECTION

PATENT NO. : 5,741,870
DATED : April 21, 1998
INVENTOR(S) : Kaoru Ikeda, et. al.

It is certified that error appears in the above-indentified patent and that said Letters Patent is hereby corrected as shown below:

Column 36, line 3    delete "defied" and insert --defined--

Signed and Sealed this

Thirtieth Day of June, 1998

Attest:

BRUCE LEHMAN

Attesting Officer

Commissioner of Patents and Trademarks